United States Patent [19]

Vasta

[11] Patent Number: 4,487,878
[45] Date of Patent: Dec. 11, 1984

[54] COATING COMPOSITION OF A SOLUTION FLUOROCARBON POLYMER, A DISPERSED FLUOROCARBON POLYMER AND A POLYAMINE CURING AGENT

[75] Inventor: Joseph A. Vasta, Wilmington, Del.

[73] Assignee: E. I. Du Pont de Nemours and Company, Wilmington, Del.

[21] Appl. No.: 591,969

[22] Filed: Mar. 21, 1984

Related U.S. Application Data

[63] Continuation-in-part of Ser. No. 509,706, Jun. 30, 1983, abandoned.

[51] Int. Cl.$^3$ .................. C07C 102/6; C07C 103/10; C07C 103/87; C08K 3/10
[52] U.S. Cl. .................. 524/413; 524/433; 524/546; 525/326.2; 525/326.3; 525/368; 525/377; 525/381; 428/325; 428/363; 428/413; 428/421; 428/422
[58] Field of Search .................. 524/413, 433, 546; 525/326.2, 326.3, 368, 377, 381; 428/325, 363, 413, 421, 422

[56] References Cited

U.S. PATENT DOCUMENTS

| | | | |
|---|---|---|---|
| 2,979,418 | 4/1961 | Dipner | 117/72 |
| 3,093,264 | 6/1963 | Harris | 220/63 |
| 3,343,841 | 8/1968 | Close | 427/386 |
| 3,366,612 | 1/1968 | Baldwin et al. | 260/85.3 |
| 3,470,014 | 9/1968 | Koblitz et al. | 117/72 |
| 3,526,532 | 9/1970 | Heiberger | 117/75 |
| 3,558,345 | 1/1971 | Baum et al. | 117/54 |
| 3,692,558 | 9/1972 | Werner | 117/72 |
| 3,824,115 | 7/1974 | Segawa et al. | 117/21 |
| 3,850,674 | 11/1974 | Clarke, Jr. et al. | 117/76 |
| 3,951,913 | 4/1976 | Kometani et al. | 525/326.3 |
| 3,955,036 | 5/1976 | Plueddemann | 428/429 |
| 3,988,502 | 10/1976 | Patel et al. | 526/18 |
| 4,035,565 | 7/1977 | Apotheker et al. | 526/249 |
| 4,098,756 | 7/1978 | Miller et al. | 523/458 |
| 4,146,532 | 3/1979 | Kometani et al. | 526/247 |
| 4,146,874 | 2/1979 | Oka et al. | 524/458 |
| 4,170,686 | 10/1979 | Miller et al. | 428/416 |
| 4,179,542 | 12/1979 | Christofas et al. | 428/324 |
| 4,237,177 | 12/1980 | Slama et al. | 428/215 |
| 4,243,767 | 1/1981 | Kaufman et al. | 525/342 |
| 4,243,770 | 1/1981 | Tatemoto et al. | 525/368 |
| 4,250,278 | 2/1981 | Suzuki et al. | 525/341 |
| 4,284,548 | 8/1981 | Kaufman et al. | 525/102 |
| 4,298,416 | 11/1981 | Casson et al. | 156/87 |
| 4,299,869 | 11/1981 | Casson et al. | 428/35 |
| 4,307,142 | 12/1981 | Blitstein et al. | 428/143 |
| 4,323,603 | 4/1982 | Close | 524/545 |
| 4,339,553 | 7/1982 | Yoshimura et al. | 524/546 |
| 4,339,565 | 7/1982 | Tomoda | 528/27 |
| 4,343,841 | 8/1982 | Close | 524/508 |
| 4,347,277 | 8/1982 | Slama et al. | 428/215 |
| 4,370,436 | 1/1983 | Nakamura | 524/546 |
| 4,396,744 | 8/1983 | Close | 525/194 |
| 4,400,482 | 8/1983 | Close | 524/114 |
| 4,423,183 | 12/1983 | Close | 524/365 |

FOREIGN PATENT DOCUMENTS 53002 6/1982 European Pat. Off. .
58393 8/1982 European Pat. Off. .

OTHER PUBLICATIONS

Derwent Abstract 52946, W/32, (Dec. 1974).
Bulletin No. 78C–15 by Abbott Laboratories, Industrial Amines, pp. 1–3.
Du Pont Sales Brochure–Viton ® Fluoroelastomers.
Abstract from Official Gazette, Aug. 23, 1983, p. 1602–U.S. 4,400,482.

Primary Examiner—Herbert J. Lilling
Attorney, Agent, or Firm—Hilmar L. Fricke

[57] ABSTRACT

A coating composition of a fluorocarbon polymer which cures at ambient temperatures in which a fluorocarbon polymer in solution is of vinylidene fluoride and hexafluoropropylene and has a weight average molecular weight of about 5,000–600,000; the composition also contains

- a dispersed fluorocarbon polymer of the following group polytetrafluoroethylene, fluorinated ethylene/propylene polymer, polyvinyl fluoride, polyvinylidene fluoride, copolymer of tetrafluoroethylene/perfluoroalkoxyvinyl ether;
- a metallic oxide such as magnesium oxide which is an acid acceptor; and
- an aliphatic or cycloaliphatic polyamine curing agent; preferably, the composition contains a reinforcing pigment such as titanium dioxide.

The coating composition is used to provide corrosion and abrasion resistant coatings for large structures in chemical plants, oil refineries, oil drilling platforms, and as a coating for the interior of smoke stacks of large utility companies.

29 Claims, No Drawings

COATING COMPOSITION OF A SOLUTION FLUOROCARBON POLYMER, A DISPERSED FLUOROCARBON POLYMER AND A POLYAMINE CURING AGENT

CROSS REFERENCE TO RELATED APPLICATIONS

This application is a continuation-in-part of application Ser. No. 509,706, filed June 30, 1983 now abandoned.

BACKGROUND OF THE INVENTION

The invention is related to a coating composition and in particular to a fluorocarbon polymer coating composition.

Fluorocarbon polymers are inert to strong acids such as sulfuric acid, nitric acid, hydrochloric acid and strong bases such as sodium hydroxide and are resistant weathering and salt water corrosion and are tough and abrasion resistant. Coatings of these polymers would be extremely useful for chemical plants and oil refineries to coat pipes, vessels and other equipment, for off shore oil well platforms and ships, and for protective coatings for the interior of smoke stacks of utility companies. Fluorocarbon polymer coatings also would be useful for coating metal smoke stack interiors that are subjected to abrasion from fly ash and corrosion by acids resulting from combustion products such as $SO_x$ and $NO_x$ and halogen ions. Conventional fluorocarbon polymer coatings require curing at elevated temperatures which is not possible with the aforementioned large structures. A fluorocarbon polymer coating composition is needed that can be applied as a thick coating without cracking and will completely cure at ambient temperatures.

The coating composition of this invention cures at ambient temperatures, has excellent adhesion to a variety of substrates, is corrosion and abrasion resistant and can be applied as a thick coating without cracking.

SUMMARY OF THE INVENTION

A coating composition containing about 10–70% by weight binder and 30–90% by weight of a nonaqueous organic liquid, wherein the binder is
   a fluorocarbon polymer in solution of vinylidene fluoride and hexafluoropropylene that has a weight average molecular weight of about 5,000–600,000;
   dispersed fluorocarbon polymer particles of the following group: polytetrafluoroethylene, fluorinated/ethylene propylene polymer, polyvinyl fluoride, polyvinylidene fluoride and copolymer of tetrafluoroethylene/per fluoroalkoxyvinyl ether;
   a metallic oxide such as magnesium oxide which is an acid acceptor; and
   a curing agent of the formula

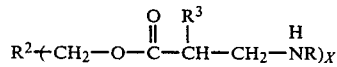

where R is $R^1 NH_2$ and $R^1$ is an aliphatic or cycloaliphatic hydrocarbon radical, $R^2$ is C or a hydrocarbon group, $R^3$ is H or $CH_3$ and x is 3 when $R^2$ is a hydrocarbon group and x is 4 when $R^2$ is C;

Preferably, the composition contains a reinforcing pigment such as titanium dioxide.

DETAILED DESCRIPTION OF THE INVENTION

The coating composition contains about 10–70% by weight binder and about 30–90% by weight of a nonaqueous organic liquid. The binder is a blend of a fluorocarbon polymer in solution, a dispersed fluorocarbon polymer, a metallic oxide which is an acid acceptor and a curing agent. An advantage of the composition is that it cures at ambient temperatures and baking is not required. Also, thick coatings of 1000 microns and greater can be applied without cracking of the coating during curing. Therefore, the composition can be used on large structures such as chemical storage tanks, chemical reactors, the interior of smoke stacks, and the like. These structures could not be subjected to baking temperatures using conventional techniques.

The fluorocarbon polymer that is in solution is of polymerized monomers of vinylidene fluoride and hexafluoropropylene. Preferably, the polymer contains about 50–70% by weight of vinylidene fluoride and about 30–50% by weight of hexafluoropropylene. The polymer can contain up to 40% by weight of other monomers such as tetrafluoroethylene. One useful polymer contains about 20–30% by weight of tetrafluoroethylene.

The fluorocarbon polymer has a weight average molecular weight of about 5,000–600,000. Preferably, fluorocarbon polymers are used that have a weight average molecular weight of about 75,000–450,000. Fluorocarbon polymers having a weight average molecular weight of 50,000–300,000 are useful. Two particularly useful fluorocarbon polymers have weight average molecular weight of about 75,000–125,000 and 150,000–250,000. Polymer in the lower end of the molecular weight range are preferred for forming a composition with higher binder content. Fluorocarbon polymers in the higher molecular weight range of 300,000–450,000 are also very useful for forming coating compositions.

Preferably, a soluble low molecular weight fluorocarbon polymer of vinylidene fluoride and hexafluoropropylene having a weight average molecular weight of about 5,000–15,000 is used in combination with a higher molecular weight fluorocarbon polymer. This low molecular weight polymer aids in dispersing pigments and the dispersed fluorocarbon polymer and forms films of 1000 microns and above without cracking of the coating on curing.

Molecular weight, as used therein, is determined by gel permeation chromatography using polymethyl methacrylate as a standard.

The dispersed fluorocarbon polymer used in the composition is not soluble in the organic liquid. Typical dispersed fluorocarbon polymers that can be used are polytetrafluoroethylene, fluorinated ethylene/propylene polymers preferably having a 70–30% by weight ethylene and 30–70% by weight propylene, polyvinylfluoride, polyvinylidene fluoride and copolymers or tetrafluoroethylene/perfluoro alkoxyvinyl ether preferably containing 8–98% by weight tetrafluoroethylene and 2–10% by weight perfluoroalkoxyvinyl ether. These dispersed fluorocarbon polymers usually have a particle size of about 1–150 microns.

These dispersed fluorocarbon polymers provided coatings with increased temperature resistance in comparison to coatings that do not contain dispersed fluorocarbon polymers. Also, coatings containing dispersed fluorocarbon polymers can be applied at a higher solids content which reduces solvent emissions. In general, the dispersed fluorocarbon polymer in the coating reinforces the coating and when the coating is subjected to temperatures which are sufficient to coalesce the dispersed fluorocarbon polymer, the polymer flows and coalesces into a matrix with the solution fluorocarbon polymer thereby enhancing physical properties of the coatings.

A metallic oxide which is an acid acceptor is used in the composition to react with the hydrofluoric acid which is generated during the curing or crosslinking reaction. Typical metallic oxides are magnesium oxide, lead oxide, calcium oxide, lead hydrogen phosphite and a mixture of calcium oxide and magnesium oxide. Magnesium oxide is preferred. Highly purified magnesium oxide is particularly preferred for high quality finishes.

The coating composition contains an amine curing agent of the formula

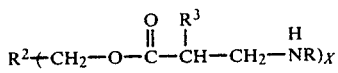

where R is $R^1 NH_2$ and $R^1$ is an aliphatic or cycloaliphatic hydrocarbon radical, $R^2$ is C or a hydrocarbon group, $R^3$ is H or $CH_3$, X is 3 when $R^2$ is a hydrocarbon group and X is 4 when $R^2$ is C.

The curing agent is prepared through a Micheal's reaction in which a multifunctional acrylate or methacrylate is reacted with a polyamine. The polyamine is heated to about 100°–150° C. and then the multifunctional acrylate or methacrylate is reacted with the polyamine for a 1-6 hour period to form an amine terminated curing agent.

Typical polyamines used to form the curing agent are isophorone diamine which is 3-aminomethyl-3,5,5-trimethyl cyclohexylamine, hexamethylene diamine, ethylene diamine, 1,4-cyclohexane bis(methylamine), 1,2 diaminopropane, propylene diamine, diethyl ether diamine, trimethyl hexamethyl methylene diamine and the like.

Typical multifunctional acrylates or methacrylates that can be used to form the curing agent are trimethylol propane acrylate, trimethylol propane methacrylate, pentaerythritol acrylate, pentaerythritol methacrylate and the like.

Isophorone diamine is one preferred polyamine which is used to form a curing in which R is

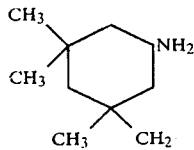

Preferably, the binder contains about 50–84.5% by weight, of the solution fluorocarbon polymer 5–20% by weight of a low molecular weight fluorocarbon polymer, 5–20% by weight of dispersed fluorocarbon polymer 0.5–20% by weight of the above amine curing agent and 5–20% by weight of a metallic oxide which is an acid acceptor such as magnesium oxide.

Another useful binder contains about 50–89.5% by weight of the solution fluorocarbon polymer, 5–20% by weight of the dispersed fluorocarbon polymer 0.5–20% by weight of one of the above amine curing agents and 5–20% by weight of a metallic oxide which is an acid acceptor.

Preferably, the composition contains a reinforcing agent such as titanium dioxide pigment usually in a pigment to binder weight ratio of about 20:100 to 200:100. Other inert pigments can be used such as barytes, barium sulfate, fibrous calcium silicate and the like. Carbon black, bone black or lamp black can also be used as a reinforcing pigment in a pigment to binder weight ratio of about 20:100 to 50:100.

Typical organic solvents that are used in the composition are acetone, tetrahydrofuran, methyl ethyl ketone, ethyl acetate, propyl acetate, butyl acetate, isobutyl acetate, methyl isobutyl ketone, methyl amyl acetate, diisobotyl ketone, ethylene glycol monomethyl ether acetate, ethylene glycol monoethyl ether and mixtures of the above. These solvents are used to make the composition and can be used to reduce the composition to an application viscosity.

To decrease curing time and increase toughness of finishes of the composition about 0.1–3% by weight, based on the weight of the binder, of a bicyclic amidine can be added. One preferred bicyclic amidine is 1,8-diaza-bicyclo(5,4,0)-undecene-7.

To improve resistance to acids at ambient temperatures and elevated temperatures of finishes formed by the composition about 1–20% by weight, based on the weight of the binder, of a perfluoroalkyl propylene oxide can be added. The perfluoroalkyl propylene oxide has the formula

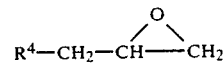

where $R^4$ is a perfluoroalkyl group having 4–12 carbon atoms. Preferably, $R^4$ is a perfluoroalkyl group of a mixture of 6–10 carbon atoms. Preferably, about 5–15% by weight of the perfluoroalkylpropylene oxide is added.

Other advantages of the perfluoroalkylpropylene oxide are as follows: the surface tension of the coating is lowered and the resulting finish has improved release characteristics in comparison to finishes that do not contain the perfluoroalkylpropylene oxide; the wetting of pigments is improved and makes dispersion of pigments less difficult and fluorocarbon polymer solids of the composition can be increased.

A combination of the aforementioned bicyclic amidine and the perfluoroalkyl propylene oxide allows the removal of the metallic oxide from the coating composition and still provides a composition that cures at ambient temperatures. Generally, about 1–10% by weight, based on the weight of binder, of the combination is used. The weight ratio of bicyclic amidine to perfluoroalkylpropylene oxide is about 1:1 to 1:5.

To improve flow of the coating composition and enhance smoothness of the resulting finish about 1–20% by weight, based on the weight of binder, of a glycidyl ester can be added to the composition. Preferably, about 5–15% by weight of glycidyl ester is used. The ester has the formula

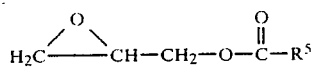

where $R^5$ is a tertiary aliphatic hydrocarbon group having 8–10 carbon atoms.

Generally, the composition is provided to a user as a two component composition. The solvents, solution fluorocarbon polymer, the dispersed fluorocarbon polymer, pigments such as titanium dioxide and metallic oxide acid acceptor are the first component and the amine curing agent is the second component which is blended by the user with the first component to form the coating composition. The composition is then reduced with one of the aforementioned solvents to an application viscosity and then applied to a substrate.

The coating composition can be applied directly over a wide variety of substrates to provide a fluorocarbon polymer coating. Typical substrates are treated or primed steel, phosphatized steel, grit blasted steel, galvanized steel, aluminum, copper, brass, cement and cementitious surfaces such as fire brick, mortar used for fire brick and the like.

Generally, the coating composition is spray applied to the substrate and the solvent is allowed to flash off between coatings, then the resulting coating is cured at ambient temperatures. The coating can be cured in about 4 to 48 hours or longer or can be heated to 80° C. to 120° C. for 0.5 to 2.0 hours for rapid curing. Generally, the resulting cured coating is about 75–1500 microns thick.

For some substrates such as untreated steel, a primer is first applied and then while the primer is still wet the coating composition is applied and dried at ambient temperatures or at the above elevated temperatures.

One useful primer contains the aforementioned binder constituents and the proper pigmentation for a primer. Another useful primer contains the solution fluorocarbon polymer, a metallic oxide acid acceptor such as magnesium oxide and amino alkyl alkoxy silane such as amino-propyl trimethoxysilane or amino-propyl triethoxysilane.

The ambient temperature curing characteristic of the coating composition allows for its application on large vessels and reactors in chemical plants and oil refineries, large metal structures and equipment and pipes, heat risers, i.e., pipes which are used to transport oil from the underground well to the surface, off shore oil well platforms, and on the interior or smoke stacks used by large utility companies. Conventional compositions that do not cure at ambient temperatures but require elevated temperatures are not practical to use for the above applications.

The following examples illustrate the invention. All parts and percentages are on a weight basis unless otherwise indicated.

EXAMPLE 1

An amine curing agent was prepared as follows:

|  | Parts by Weight |
| --- | --- |
| Isophorone diamine | 510 |
| Trimethylol propane acrylate | 296 |
| Isopropanol | 659 |
| Total | 1465 |

The diamine was charged into a reaction vessel and heated to about 120°–140° C. and then the acrylate was slowly added at a uniform rate over a 4 hour period and then the resulting reaction mixture was cooled and isopropanol was added.

A coating composition was prepared as follows:

|  | Parts By Weight |
| --- | --- |
| Portion 1 |  |
| Titanium dioxide pigment | 100.0 |
| Magnesium oxide | 15.0 |
| Fluorocarbon polymer solution (33% solids solution in ethyl acetate of a copolymer of 60% vinylidene fluoride and 40% hexafluoropropylene having a weight average molecular weight of about 100,000) | 303.0 |
| Polyvinylidene fluoride powder (5 to 100 microns and the polymer has a weight average molecular weight of 80,000 to 100,000) | 25.0 |
| Low molecular weight fluorocarbon polymer (copolymer of 60% vinylidene fluoride and 40% hexafluoropropylene having a weight average molecular weight of about 6400) | 25.0 |
| Ethyl acetate | 50.0 |
| Portion 2 |  |
| Amine curing agent (prepared above) | 5.5 |
| Bicyclic amidine (1,8-diaza-bicyclo [5,4,0]-undecene-7) | 0.1 |
| Total | 523.6 |

The constituents of portion 1 were charged into a mixing vessel and thoroughly blended and portion 2 was added and blended. The resulting composition was reduced with methyl ethyl ketone solvent to a spray viscosity of about 25 seconds using a No. 2 Zahn cup and sprayed onto grit blasted steel panels and aluminum panels. In each case, thick films were applied by allowing flash drying between each application and the coatings were dried at ambient temperature to provide a 1000 micron thick dry coating. In each case, the coating had excellent adhesion to the metal substrate. After 7 days, the coatings were fully cured and resistant to sulfuric acid, sodium hydroxide and solvents such as methyl ethyl ketone and ethyl acetate.

A primer was prepared as follows:

|  | Parts By Weight |
| --- | --- |
| Portion 1 |  |
| Titanium dioxide pigment | 100.0 |
| Magnesium oxide | 15.0 |
| Fluorocarbon polymer solution (33% solids solution in ethyl acetate of a copolymer of 60% vinylidene fluoride and 40% hexafluoropropylene having a weight average molecular weight of about 100,000) | 303.0 |
| Portion 2 |  |
| Gamma-aminopropyltrimethoxy silane | 18.0 |
| Bicyclic amidine (described above) | 0.1 |
| Total | 436.1 |

The constituents of portion 1 were charged into a mixing vessel and thoroughly blended and then portion 2 was added and blended. The resulting composition was reduced to a spray viscosity with methyl ethyl ketone and sprayed onto untreated steel panels and solvent was allowed to flash from the primer at ambient temperatures. The resulting primer coat had a thickness of about 75 microns.

The above coating composition was sprayed onto the primed panels. In each case, thick films were applied by allowing flash drying between each spray application of the coating composition. The resulting coatings were dried at ambient temperatures and were 1000 microns thick.

On each panel, the coating had excellent adhesion to the primer and could not be separated from the primer. After 7 days, each coating was fully cured and was resistant to sulfuric acid, sodium hydroxide and solvents such as methyl ethyl ketone and ethyl acetate.

EXAMPLE 2

The following amine curing agents were prepared:

|  | CURING AGENT (Parts By Weight) | | |
|---|---|---|---|
|  | A | B | C |
| Isophorone diamine | — | 562 | — |
| Hexamethylene diamine | 321 | — | 388 |
| Trimethylol propane acrylate | 296 | — | — |
| Pentaerythritol acrylate | — | 298 | 298 |
| Isopropanol | 505 | 703 | 562 |
| Total | 1122 | 1563 | 1248 |

In the preparation of each of the above curing agents A–C the amine was charged into a reaction vessel and heated to 120°–140° C. and then the acrylate was slowly added at a uniform rate over a 4 hour period and then the reaction mixture was cooled and isopropanol added.

Trimethylol propane acrylate and pentaerythritol acrylate were prepared by conventional techniques well known to those skilled in the art in which acrylate moiety was attached to trimethylol propane and pentaerythritol.

A separate coating composition was prepared with each of the curing agents A–C using the same constituents as in Example 1 for the coating composition except the above curing agent was substituted for the amine curing agent of Example 1. In each case, the resulting coating composition was reduced to a spray viscosity with methyl ethyl ketone as in Example 1 and sprayed onto grit blasted steel panels and aluminum panels allowing the coating to flash dry between each application to provide a 1000 micron thick dry coating. After 7 days, the coatings were fully cured but were softer and more elastic than the coating of Example 1. The coatings were resistant to sulfuric acid, sodium hydroxide and methyl ethyl ketone.

EXAMPLE 3

Coating compositions 1-10 were prepared using the constituents shown in the attached Table. For each composition, the constituents of portion 1 were charged into a mixing vessel and thoroughly blended and portion 2 was added and blended. The resulting composition was reduced with methyl ethyl ketone solvent to a spray viscosity of about 25 seconds using a No. 2 Zahn cup and sprayed onto grit blasted steel panels and aluminum panels. In each case, thick films were applied by allowing flash drying between each application and the coatings were dried at ambient temperatures. The resulting dry coatings were a 1000 microns thick. In each case, the coatings from compositions 1-10 had excellent adhesion to the metal substrate. After 7 days, each of the coatings of compositions 1-10 were fully cured and were resistant to sulfuric acid, sodium hydroxide and solvents such as methyl ethyl ketone and ethyl acetate.

TABLE

| Coating Composition | (Parts By Weight) | | | | | | | | | |
|---|---|---|---|---|---|---|---|---|---|---|
|  | 1 | 2 | 3 | 4 | 5 | 6 | 7 | 8 | 9 | 10 |
| Portion 1 | | | | | | | | | | |
| Titanium dioxide pigment | 100 | → | → | → | → | → | → | → | → | → |
| Magnesium oxide | 15 | → | → | → | → | → | → | → | → | → |
| Fluorocarbon polymer solution (Described in Example 1) | 151.5 | 151.5 | 151.5 | 151.5 | 151.5 | — | — | — | — | — |
| Fluorocarbon polymer solutions (Same as Example 1 except polymer has a weight average molecular weight of 200,000) | — | — | — | — | — | 151.5 | 151.5 | 151.5 | 151.5 | 151.5 |
| Low molecular weight fluorocarbon polymer (Described in Example 1) | 25 | → | → | → | → | → | → | → | → | → |
| Tetrafluoroethylene/perfluoroalkoxy-vinyl ether copolymer (97/3 ratio) | 25 | — | — | — | — | 25 | — | — | — | — |
| Polytetrafluoroethylene | — | 25 | — | — | — | — | 25 | — | — | — |
| Fluorinated ethylene/propylene polymer | — | — | 25 | — | — | — | — | 25 | — | — |
| Polyvinyl fluoride | — | — | — | 25 | — | — | — | — | 25 | — |
| Polyvinylidene fluoride | — | — | — | — | 25 | — | — | — | — | 25 |
| Ethyl acetate | 50 | → | → | → | → | → | → | → | → | → |
| Portion 2 | | | | | | | | | | |
| Amine curing agent (Described in Example 1) | 5.5 | → | → | → | → | → | → | → | → | → |
| Bicyclic amidine (Described in Example 1) | 0.1 | → | → | → | → | → | → | → | → | → |

EXAMPLE 4

Coating compositions 11-13 were prepared as follows:

|  | Coating Composition (Parts by Weight) | | |
|---|---|---|---|
|  | 11 | 12 | 13 |
| Portion 1 | | | |
| Polytetrafluoroethylene Powder | 56.25 | — | — |
| Fluorinated ethylene/propylene powder | — | 56.25 | — |
| Polyvinylidene Fluoride Powder | — | — | 56.25 |
| Fluorocarbon polymer solution (33.3% solids in ethyl acetate of a copolymer of 60% vinylidene fluoride and 40% hexafluoropropylene having a weight average molecular weight of about 400,000) | 430.74 | 430.74 | 430.74 |
| Perfluoroalkylpropylene oxide | 8.44 | 8.44 | 8.44 |

-continued

| | Coating Composition (Parts by Weight) | | |
|---|---|---|---|
| | 11 | 12 | 13 |
| of the formula $R^4-CH_2-CH\overset{O}{\diagdown\!\!\!\diagup}CH_2$ $R^4$ is a mixture of perfluoroalkyl group of 1% $C_4$, 48.5% $C_6$, 34.0% $C_8$, 12.0% $C_{10}$, 2.5% $C_{12}$, and 2% $C_{14}$. | | | |
| "Cardura" E Ester (glycidyl ester of the formula $H_2C\overset{O}{\diagdown\!\!\!\diagup}CH-CH_2-O-\overset{O}{\overset{\|}{C}}-R^5$ where $R^5$ is a tertiary aliphatic hydrocarbon group of 8-10 carbon atoms) | 8.44 | 8.44 | 8.44 |
| Titanium Dioxide Pigment | 213.75 | 213.75 | 213.75 |
| Magnesium Oxide (99.6% pure) | 8.44 | 8.44 | 8.44 |
| Butyl acetate | 112.21 | 112.21 | 112.21 |
| Methyl ethyl ketone | 111.73 | 111.73 | 111.73 |
| Portion 2 | | | |
| Bicyclic amidine Solution (10% solids in isopropanol of bicyclic amidine described in Example 1) | 16.87 | 16.87 | 16.87 |
| Amine Curing Agent B (described in Example 2) | 15.35 | 15.35 | 15.35 |
| Isopropanol | 17.78 | 17.78 | 17.78 |
| Total | 1000.00 | 1000.00 | 1000.00 |

For each coating composition Portion 1 was charged into a pebble mill and ground to a fineness of 0.5 mils. Portion 2 was then mixed with Portion 1 to form a coating composition. The resulting composition was reduced with methyl ethyl ketone to a spray viscosity of about 25 seconds using a No. 2 Zahn cup and sprayed onto grit blasted steel panels and aluminum panels. In each case, thick films were applied by allowing flash drying between each application and the coatings were dried at ambient temperatures. The resulting dry coatings were a 1000 microns thick. In each case, the coatings from compositions 11-13 had excellent adhesion to the metal substrate. After 7 days, each of the coatings of composition 11-13 were fully cured and were resistant to sulfuric acid, sodium hydroxide and solvents such as methyl ethyl ketone and ethyl acetate.

I claim:

1. A coating composition comprising about 10-70% by weight binder and 30-90% by weight of a non-aqueous organic liquid; wherein the binder comprises:
   a fluorocarbon polymer in solution comprising vinylidene fluoride and hexafluoropropylene having a weight average molecular weight of about 5,000-600,000;
   dispersed fluorocarbon polymer particles having a particle size of about 1-150 microns and being selected from the group consisting of polytetrafluoroethylene, fluorinated ethylene/propylene polymer, polyvinyl fluoride, polyvinylidene fluoride, copolymer of tetrafluoroethylene/perfluoroalkoxyvinylether;
   a metallic oxide which is an acid acceptor; and
   a curing agent of the formula $$R^2\text{-}(CH_2-O-\overset{O}{\overset{\|}{C}}-\overset{R^3}{\overset{|}{CH}}-CH_2-\overset{H}{N}R)_x$$

where R is $R^1NH_2$ and $R^1$ is aliphatic or cycloaliphatic hydrocarbon radical, $R^2$ is C or a hydrocarbon group, $R^3$ is H or $CH_3$, X is 3 when $R^2$ is a hydrocarbon group and X is 4 when $R^2$ is C.

2. The composition of claim 1 in which the fluorocarbon polymer has a weight average molecular weight of about 50,000-300,000.

3. The composition of claim 1 in which the fluorocarbon polymer has a weight average molecular weight of about 75,000-250,000.

4. The composition of claim 1 in which the fluorocarbon polymer has a weight average molecular weight of about 300,000-400,000.

5. The composition of claim 1 in which the fluorocarbon polymer consists essentially of about 50-70% by weight of vinylidene fluoride and 30-50% by weight of hexafluoropropylene.

6. The composition of claim 5 in which the metallic oxide is magnesium oxide.

7. The coating composition of claim 6 in which $R^1$ is a cycloaliphatic hydrocarbon radical.

8. The coating composition of claim 7 in which the dispersed polymer is polytetrafluoroethylene.

9. The coating composition of claim 7 in which the dispersed polymer is a fluorinated ethylene/propylene polymer.

10. The coating composition of claim 7 in which the dispersed polymer is polyvinyl fluoride.

11. The coating composition of claim 7 in which the dispersed polymer is polyvinylidene fluoride.

12. The coating composition of claim 7 in which the dispersed polymer is a copolymer of tetrafluoroethylene and perfluoroalkoxyvinyl ether.

13. The coating Composition of claim 7 containing a filler pigment of titanium dioxide.

14. The composition of claim 7 containing about 0.1-3% by weight, based on the weight of the binder, of a bicyclic amidine.

15. The composition of claim 14 containing in addition about 1-20% by weight, based on the weight of the binder, of perfluoroalkylpropylene oxide.

16. The composition of claim 14 in which the perfluoroalkyl propylene oxide has the formula $$R^4-CH_2-CH\overset{O}{\diagdown\!\!\!\diagup}CH_2$$

where $R^4$ is a perfluoroalkyl group having 4-12 carbon atoms.

17. The composition of claim 14 containing in addition about 1-20% by weight, based on the weight of the binder, of a glycidyl ester of the formula $$CH_2\overset{O}{\diagdown\!\!\!\diagup}CH-CH_2-\overset{O}{\overset{\|}{C}}-OR^5$$

where $R^5$ is a tertiary aliphatic hydrocarbon group having 8-10 carbon atoms.

18. The composition of claim 14 where $R^2$ of the curing agent is C or $C_3H_5$, $R^3$ is H and R is

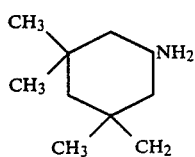

19. The coating composition of claim 1 in which the binder comprises:
   (a) 50-84.5% by weight of a fluorocarbon polymer in solution consisting essentially of polymerized units of 50-70% by weight, based on the weight of the polymer, of vinylidene fluoride and 30-50% by weight, based on the weight of the polymer, of hexafluoropropylene and has a weight average molecular weight of about 75,000-450,000;
   (b) 5-20% by weight of a low molecular weight fluorocarbon polymer in solution consisting essentially of polymerized units of 50-70% by weight, based on the weight of the polymer, of vinylidene fluoride and 30-50% by weight, based on the weight of the polymer, of hexafluoropropylene and has a weight average molecular weight of about 5,000-15,000;
   (c) 5-20% by weight of a dispersed fluorocarbon polymer selected from the group consisting of polytetrafluoroethylene, fluorinated ethylene/propylene polymer, polyvinylfluoride, polyvinylidene fluoride, copolymer of tetrafluoroethylene/perfluoroalkoxyvinyl ether
   (d) 5-20% by weight, based on the weight of the binder, of magnesium oxide; and
   (e) 0.5-20% by weight, based on the weight of the binder, of a curing agent wherein $R^2$ is C or $C_3H_5$, $R^3$ is H and R is

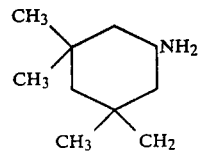

20. The coating composition of claim 19 containing titanium dioxide pigment in a pigment to binder weight ratio of about 20:100-200:100.

21. The coating composition of claim 20 containing about 0.1-3% by weight, based on the weight of the binder of 1,8-diaza-bicyclo(5,4,0)undecene-7.

22. The composition of claim 19 in which the perfluoroalkylpropylene oxide has the formula

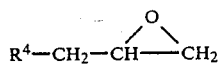

where $R^4$ is a perfluoroalkyl group having 4-12 carbon atoms.

23. The composition of claim 19 containing in addition about 5-15% by weight, based on the weight of the binder, of a glycidyl ester of the formula

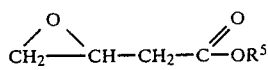

where $R^5$ is a tertiary aliphatic hydrocarbon group having 8-10 carbon atoms.

24. A coating composition comprising about 10-70% by weight binder and 30-90% by weight of a nonaqueous organic liquid; wherein the binder comprises:
   a fluorocarbon polymer in solution comprising vinylidene fluoride and hexafluoropropylene having a weight average molecular weight of about 5,000-600,000
   dispersed fluorocarbon polymer particles having a particle size of about 1-150 microns and being selected from the group consisting of polytetrafluoroethylene, fluorinated ethylene/propylene polymer, polyvinyl fluoride, polyvinylidene fluoride, copolymer of tetrafluoroethylene/perfluoroalkoxyvinyl ether;
   a curing agent of the formula

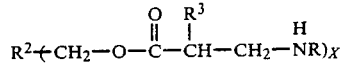

where R is a cycloaliphatic hydrocarbon radical, $R^3$ is H or $CH_3$, X is 3 when $R^2$ is a hydrocarbon group and X is 4 when $R^2$ is C;
   perfluoropropylene oxide; and
   a bicyclic amidine.

25. The composition of claim 24 in which the bicyclic amidine is 1,8-diaza-bicyclo(5,4,0)-undecene-7.

26. The composition of claim 24 containing in addition 1-20% by weight, based on the weight of the binder, of a glycidyl ester of the formula

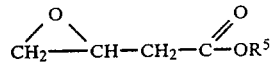

is a tertiary aliphatic hydrocarbon group having 8-10 carbon atoms.

27. The composition of claim 24 in which the perfluoroalkyl propylene oxide has the formula

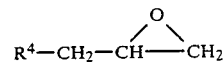

where $R^4$ is a perfluoroalkyl group having 4-12 carbon atoms.

28. A two-component composition, wherein the two components are mixed together to form a composition comprising about 10-70% by weight binder and 30-90% by weight organic solvent and wherein the components comprise
   component (1) a solution of a fluorocarbon polymer consisting essentially of vinylidene fluoride and hexafluoropropylene having a weight average molecular weight of about 5,000-600,000, a dispersed fluoro-
   dispersed fluorocarbon polymer particles having a particle size of about 1-150 microns and being selected from the group consisting of polytetrafluoroethylene, fluorinated ethylene/propylene polymer, polyvinyl fluoride, polyvinylidene fluoride, copolymer of tetrafluoroethylene/perfluoroalkoxyvinyl ether and a metallic oxide which is an acid acceptor; and
   component (2) a curing agent of the formula

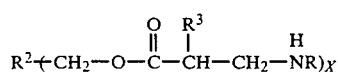
where R is $R^1NH_2$ and $R^1$ is aliphatic or cycloaliphatic hydrocarbon radical, $R^2$ is C or a hydrocarbon group, $R^3$ is H or $CH_3$, X is 3 when $R^2$ is a hydrocarbon group and X is 4 when $R^2$ is C.
29. A substrate coated with a layer of the composition of claim 1.
* * * * *